United States Patent
Hayase (10) Patent No.: US 10,818,943 B2
(45) Date of Patent: Oct. 27, 2020

(54) FUEL CELL SYSTEM AND CONTROL METHOD FOR TURBINE

(71) Applicant: TOYOTA JIDOSHA KABUSHIKI KAISHA, Toyota-shi, Aichi-ken (JP)

(72) Inventor: Yuichiro Hayase, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 63 days.

(21) Appl. No.: 16/177,350

(22) Filed: Oct. 31, 2018

(65) Prior Publication Data

US 2019/0131642 A1   May 2, 2019

(30) Foreign Application Priority Data

Nov. 2, 2017 (JP) .................. 2017-212389

(51) Int. Cl.
*H01M 8/0432* (2016.01)
*H01M 8/04701* (2016.01)
*H01M 8/04746* (2016.01)
*H01M 8/04223* (2016.01)
*H01M 8/04111* (2016.01)
*H01M 8/0438* (2016.01)

(52) U.S. Cl.
CPC ..... *H01M 8/04716* (2013.01); *H01M 8/0432* (2013.01); *H01M 8/0435* (2013.01); *H01M 8/04111* (2013.01); *H01M 8/04253* (2013.01); *H01M 8/04373* (2013.01); *H01M 8/04395* (2013.01); *H01M 8/04761* (2013.01); *H01M 8/04776* (2013.01); *H01M 8/04783* (2013.01); *H01M 2250/20* (2013.01)

(58) Field of Classification Search
None
See application file for complete search history.

(56) References Cited

U.S. PATENT DOCUMENTS

| 2004/0151964 A1* | 8/2004 | Finger ............. H01M 8/04111 429/443 |
| 2010/0159360 A1* | 6/2010 | Stute .............. H01M 8/04111 429/513 |

FOREIGN PATENT DOCUMENTS

| JP | 2008-169788 A | 7/2008 |
| JP | 2012-221657 A | 11/2012 |
| JP | 2018139194 | * 9/2018 |
| KR | 101050847 B1 * | 7/2011 |

* cited by examiner

*Primary Examiner* — Jonathan Crepeau
(74) *Attorney, Agent, or Firm* — Hunton Andrews Kurth LLP (57) ABSTRACT

A fuel cell system includes: a turbine including a changing mechanism that adjusts a pressure difference between an upstream pressure and a downstream pressure of the turbine, the turbine recovering at least a part of energy of the cathode off-gas using the pressure difference and assisting driving of the motor with the recovered energy; and a control unit configured to drive the changing mechanism to increase or decrease the recovered energy. The control unit acquires a correlation temperature correlated with a temperature of the cathode off-gas discharged from the turbine and performs freezing avoidance control of not setting the degree of opening to be equal to or less than a predetermined degree of opening when the correlation temperature is lower than a predetermined threshold temperature at which the turbine is able to become frozen.

7 Claims, 9 Drawing Sheets

LARGE DEGREE OF OPENING

FIG. 4

SMALL DEGREE OF OPENING

FUEL CELL SYSTEM AND CONTROL METHOD FOR TURBINE

INCORPORATION BY REFERENCE

The disclosure of Japanese Patent Application No. 2017-212389 filed on Nov. 2, 2017 including the specification, drawings and abstract is incorporated herein by reference in its entirety.

BACKGROUND

1. Technical Field

The disclosure relates to a fuel cell system including a turbine that assists driving of a compressor, and a control method for the turbine.

2. Description of Related Art

In the related art, a fuel cell system including a compressor that supplies a cathode gas to a fuel cell is known. In a fuel cell system described in Japanese Unexamined Patent Application Publication No. 2012-221657 (JP 2012-221657 A), a turbine is rotated by the energy of a cathode off-gas of which the temperature has increased due to emission of heat from a fuel cell and driving of a compressor is assisted with the power generated by such rotation.

SUMMARY

However, in the fuel cell system described in JP 2012-221657 A, there is a problem in that an amount of energy recovered from the cathode gas may not be sufficient. Therefore, the inventor of the disclosure attempted to increase the amount of energy recovered by narrowing a flow passage for the cathode off-gas to increase a pressure difference between an upstream pressure and a downstream pressure of the turbine. When the flow passage for the cathode off-gas is narrowed, the temperature decreases due to expansion of the cathode off-gas and thus there is a problem in that there is a likelihood that there will be dew condensation on and freezing of the turbine due to a large amount of water vapor included in the cathode off-gas.

According to a first aspect of the disclosure, there is provided a fuel cell system including: a fuel cell; a compressor that supplies a cathode gas to the fuel cell; a motor that drives the compressor; a cathode gas discharge passage into which a cathode off-gas discharged from the fuel cell flows; a turbine that is disposed in the cathode gas discharge passage and is driven by the cathode off-gas, the turbine including a changing mechanism that changes a degree of opening of a flow passage for the cathode off-gas passing through the turbine to adjust a pressure difference between an upstream pressure and a downstream pressure of the turbine, the turbine recovering at least a part of energy of the cathode off-gas using the pressure difference and assisting driving of the motor with the recovered energy; and a control unit configured to drive the changing mechanism to increase or decrease the recovered energy. The control unit is configured to acquire a correlation temperature correlated with a first temperature of the cathode off-gas discharged from the turbine and to perform freezing avoidance control of not setting the degree of opening to be equal to or less than a predetermined degree of opening when the correlation temperature is lower than a predetermined threshold temperature at which the turbine is able to become frozen. In this fuel cell system, since the correlation temperature correlated with the first temperature is acquired and the degree of opening is not set to be equal to or less than the predetermined degree of opening when the correlation temperature is lower than the predetermined threshold temperature at which the turbine is able to become frozen, it is possible to curb a decrease in an amount of energy recovered from the cathode off-gas, to curb a decrease in the first temperature of the cathode off-gas discharged from the turbine, and to curb freezing of the turbine.

The control unit may be configured to increase the degree of opening as the freezing avoidance control. According to this configuration, when the correlation temperature is lower than the predetermined threshold temperature at which the turbine is able to become frozen, the degree of opening is increased. Accordingly, it is possible to curb expansion of the cathode off-gas discharged from the turbine, to further curb a decrease in the first temperature of the cathode off-gas, and to further curb freezing of the turbine.

The control unit may be configured to acquire a second temperature of the cathode gas which has not yet been introduced into the compressor as the correlation temperature. According to this configuration, since the second temperature of the cathode gas which has not yet been introduced into the compressor is acquired as the correlation temperature, it is possible to accurately detect a low-temperature environment in which the turbine is able to become frozen.

The control unit may be configured to perform the freezing avoidance control when the correlation temperature is lower than the threshold temperature and a predetermined time has not elapsed after the fuel cell system has been started. According to this configuration, the freezing avoidance control is performed when the correlation temperature is lower than the threshold temperature and a predetermined time has not elapsed after the fuel cell system has been started. Accordingly, it is possible to prohibit a decrease in the degree of opening when a predetermined time has elapsed after being started and there is a low likelihood that the turbine will freeze and to curb a decrease in an amount of energy recovered from the cathode off-gas.

The fuel cell system may further include a temperature sensor that detects a third temperature of the cathode off-gas which has been discharged from the fuel cell and has not yet been introduced into the turbine. The control unit may be configured to estimate the first temperature based on the detected third temperature of the cathode off-gas and to acquire the estimated first temperature as the correlation temperature. According to this configuration, since the first temperature is estimated based on the detected third temperature of the cathode off-gas and the estimated first temperature is acquired as the correlation temperature, it is possible to control the degree of opening using a temperature having a high correlation with the actual first temperature.

The control unit may be configured to calculate the degree of opening at which the correlation temperature is equal to the threshold temperature and to control the degree of opening such that the degree of opening becomes the calculated degree of opening as the freezing avoidance control. According to this configuration, since the degree of opening is calculated such that the estimated first temperature is equal to the threshold temperature and the degree of opening is controlled such that the degree of opening becomes the calculated degree of opening, it is possible to curb an excessive increase in the degree of opening and a decrease in an amount of energy recovered from the cathode off-gas.

According to a second aspect of the disclosure, there is provided a control method for a turbine that is driven by a cathode off-gas discharged from a fuel cell to recover at least a part of energy of the cathode off-gas and to assist driving of a driving motor of a compressor supplying the cathode gas to the fuel cell using the recovered energy. The control method includes: acquiring a correlation temperature correlated with a first temperature of the exhaust gas discharged from the turbine; and not setting a degree of opening of a flow passage for the exhaust gas passing through the turbine to be equal to or less than a predetermined degree of opening when the correlation temperature is lower than a predetermined threshold temperature at which the turbine is able to become frozen.

The disclosure may be embodied in various forms other than the fuel cell system and the control method for a turbine. For example, the disclosure may be embodied in forms such as a control method for a fuel cell system and a vehicle including a fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

A-1. Configuration of Fuel Cell System

Figure 1:
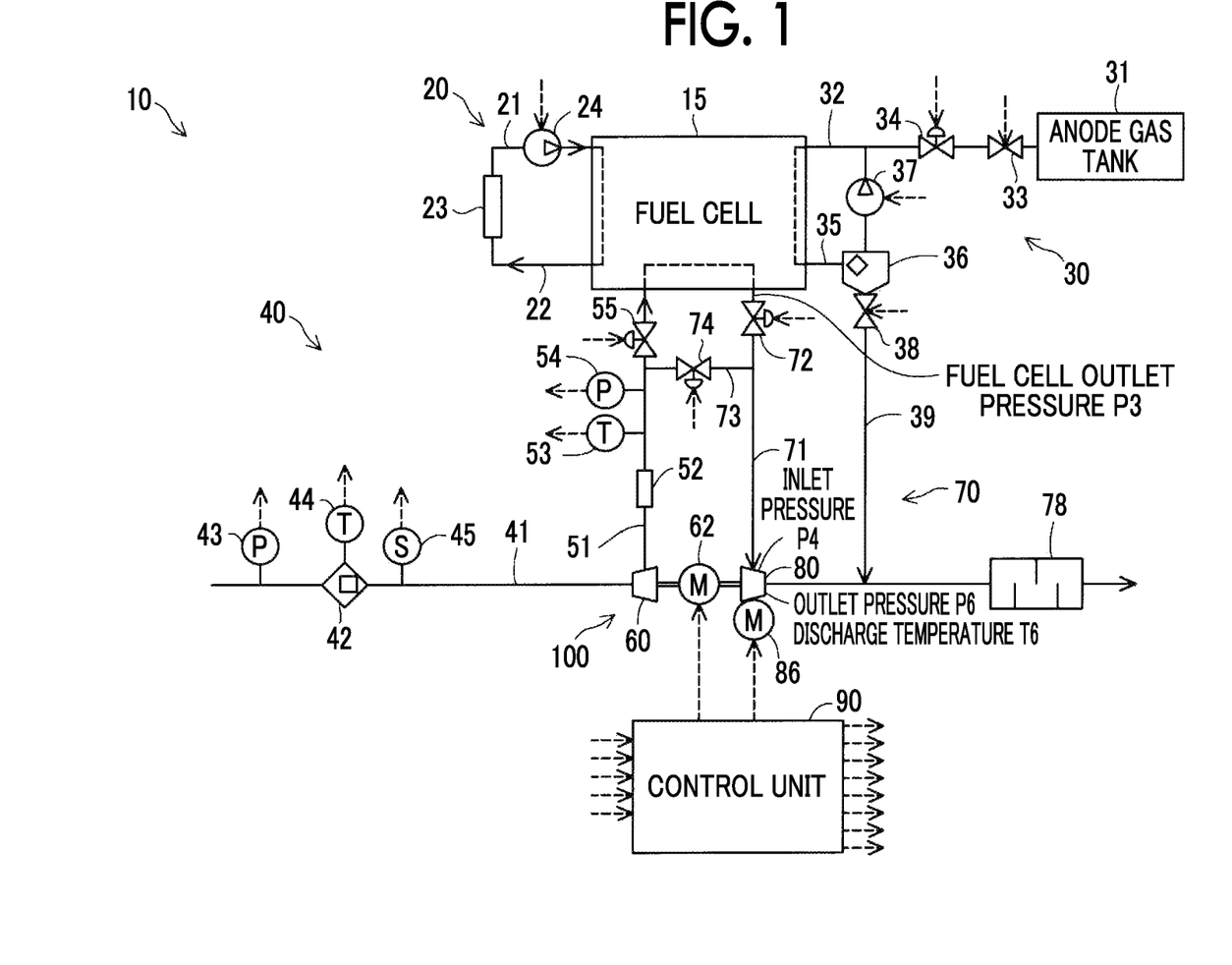
FIG. 1 is a diagram schematically illustrating a configuration of a fuel cell system according to a first embodiment.

FIG. 1 is a diagram schematically illustrating a configuration of a fuel cell system according to an embodiment of the disclosure. A fuel cell system 10 is a system that supplies a driving power source and is mounted in a fuel-cell vehicle which is not illustrated.

The fuel cell system 10 includes a fuel cell 15, a cooling system 20, an anode gas supply/discharge system 30, a turbine-attached compressor unit 100 (hereinafter simply referred to as a "unit 100"), a cathode gas supply system 40, a cathode gas discharge system 70, and a control unit 90.

The fuel cell 15 is a so-called solid polymer type fuel cell and generates electric power with reactant gases (an anode gas and a cathode gas) being supplied. The fuel cell 15 has a stacked structure in which a plurality of unit cells is stacked.

The cooling system 20 cools the fuel cell 15. The cooling system 20 includes a coolant supply passage 21, a coolant discharge passage 22, a radiator 23, and a coolant pump 24.

The coolant supply passage 21 supplies cooling water as the coolant to the fuel cell 15. An antifreeze fluid such as ethylene glycol, air, or the like may be used as the cooling water. The coolant discharge passage 22 sends the coolant discharged from the fuel cell 15 to the radiator 23. The radiator 23 dissipates heat from the coolant. The coolant pump 24 is disposed in the coolant supply passage 21 and circulates the coolant.

The anode gas supply/discharge system 30 supplies hydrogen as an anode gas to the fuel cell 15 and discharges hydrogen therefrom. The anode gas supply/discharge system 30 includes an anode gas tank 31, an anode gas supply passage 32, a main stop valve 33, a pressure regulating valve 34, an anode gas circulation passage 35, a gas-liquid separator 36, a circulation pump 37, an anode off-gas/liquid valve 38, and an anode off-gas/liquid passage 39.

The anode gas tank 31 stores high-pressure hydrogen. The anode gas supply passage 32 connects the anode gas tank 31 and the fuel cell 15. The main stop valve 33 and the pressure regulating valve 34 are provided in the anode gas supply passage 32. The main stop valve 33 turns on or off supply of an anode gas from the anode gas tank 31 in accordance with a command from the control unit 90. The pressure regulating valve 34 is disposed downstream from the main stop valve 33 and adjusts a pressure of the anode gas supplied to the fuel cell 15 in accordance with a command from the control unit 90.

The anode gas circulation passage 35 is connected to the fuel cell 15 and the anode gas supply passage 32 and circulates an anode off-gas discharged from the fuel cell 15 in the anode gas supply passage 32. The gas-liquid separator 36 and the circulation pump 37 are provided in the anode gas circulation passage 35. The gas-liquid separator 36 separates liquid water from the anode off-gas containing liquid water which is discharged from the fuel cell 15. The gas-liquid separator 36 also separates impurity gases contained in the anode off-gas, for example, nitrogen gas. The anode off-gas containing non-used hydrogen gas is circulated in the anode gas supply passage 32 by the circulation pump 37. The anode off-gas/liquid valve 38 is opened at a predetermined time in accordance with a command from the control unit 90. Accordingly, the separated liquid water and the separated nitrogen gas are discharged from the system via the anode off-gas/liquid passage 39.

The unit 100 includes a compressor 60 and a turbine 80. The compressor 60 is assembled into the cathode gas supply system 40, and the turbine 80 is assembled into the cathode gas discharge system 70. The compressor 60 and the turbine 80 are connected to each other via a motor 62. The unit 100 recovers energy from a cathode off-gas and feeds the cathode gas to the fuel cell 15 using the recovered energy as auxiliary power.

Figure 2:
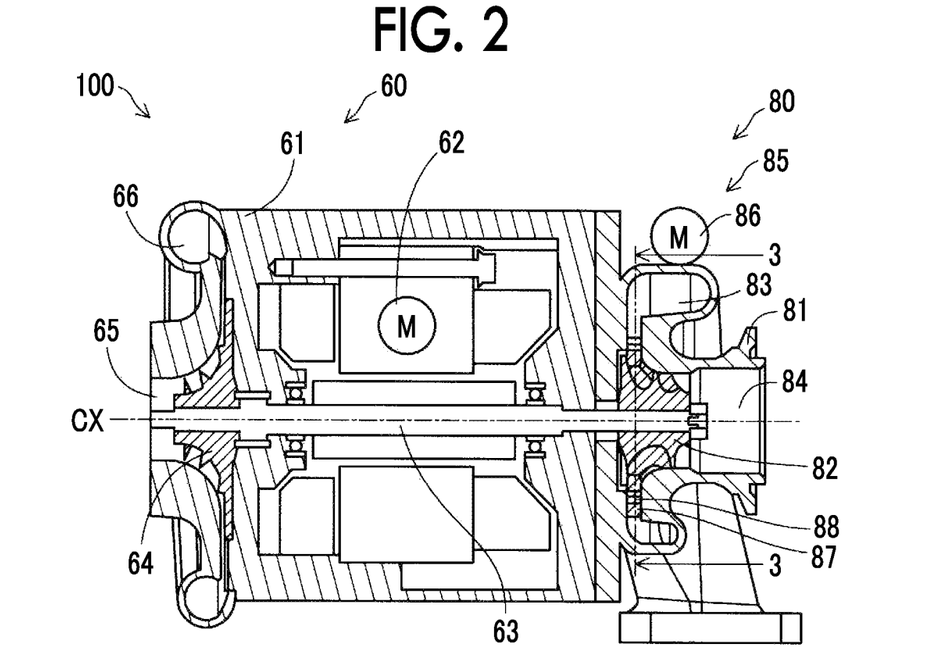
FIG. 2 is a diagram schematically illustrating a configuration of a unit.

FIG. 2 is a diagram schematically illustrating a configuration of the unit 100. In FIG. 2, a part of the unit 100 is illustrated in a sectional view including an axis CX of the motor 62.

The compressor 60 includes a housing 61, a motor 62, a shaft 63, an impeller 64, an inlet duct 65, and a compressor scroll 66. The compressor 60 suctions in and compresses air as a cathode gas and feeds the compressed air to the fuel cell 15 illustrated in FIG. 1.

The housing 61 has the elements of the compressor 60 accommodated therein. The motor 62 operates in accordance with a command from the control unit 90 and drives the compressor 60. The shaft 63 is configured as a rotation shaft of the motor 62 and transmits a rotational torque of the motor 62 to the impeller 64. The impeller 64 is constituted by a vane wheel, and compresses and feeds the cathode gas sucked from the inlet duct 65 to the compressor scroll 66 using a centrifugal force when it rotates. The inlet duct 65 is connected to an upstream supply passage 41 of the cathode gas supply system 40 illustrated in FIG. 1. The compressor scroll 66 illustrated in FIG. 2 has a spiral appearance and guides the compressed cathode gas to a downstream supply passage 51 of the cathode gas supply system 40 illustrated in FIG. 1.

The turbine 80 includes a turbine housing 81, a turbine wheel 82, a turbine scroll 83, an outlet duct 84, and a changing mechanism 85. The turbine 80 recovers at least a part of the energy of the cathode off-gas discharged from the fuel cell 15 illustrated in FIG. 1, and assists driving of the motor 62 using the recovered energy.

The turbine housing 81 is formed integrally with the housing 61, and has the elements of the turbine 80 accommodated therein. The turbine wheel 82 is configured as a vane wheel, and rotates with the energy of the cathode off-gas. The turbine wheel 82 is connected to the impeller 64 via the shaft 63. Power generated by the rotation of the turbine wheel 82 is transmitted to the motor 62 and is used as auxiliary power for the motor 62. The turbine scroll 83 has a spiral appearance, is connected to a cathode gas discharge passage 71 illustrated in FIG. 1, and takes the cathode off-gas discharged from the fuel cell 15 into the turbine housing 81. The outlet duct 84 illustrated in FIG. 2 guides the cathode off-gas passing through the turbine wheel 82 to the cathode gas discharge passage 71 illustrated in FIG. 1, more specifically, to a muffler 78. The temperature of the cathode off-gas passing through the turbine 80 decreases according to an expansion stroke of the turbine 80.

The changing mechanism 85 has a so-called variable nozzle type structure, changes a degree of opening of a flow passage (hereinafter simply referred to as a "degree of opening") of the cathode off-gas passing through the turbine 80, and adjusts a pressure difference between an upstream pressure and a downstream pressure of the turbine 80. The degree of opening of the flow passage for the cathode off-gas passing through the turbine 80 is also referred to as a degree of opening of the changing mechanism 85. The changing mechanism 85 includes a changing mechanism driving motor 86, a plurality of variable vanes 87, and a plurality of shaft portions 88. The changing mechanism driving motor 86 rotates the variable vanes 87 in accordance with a command from the control unit 90.

Figure 3:
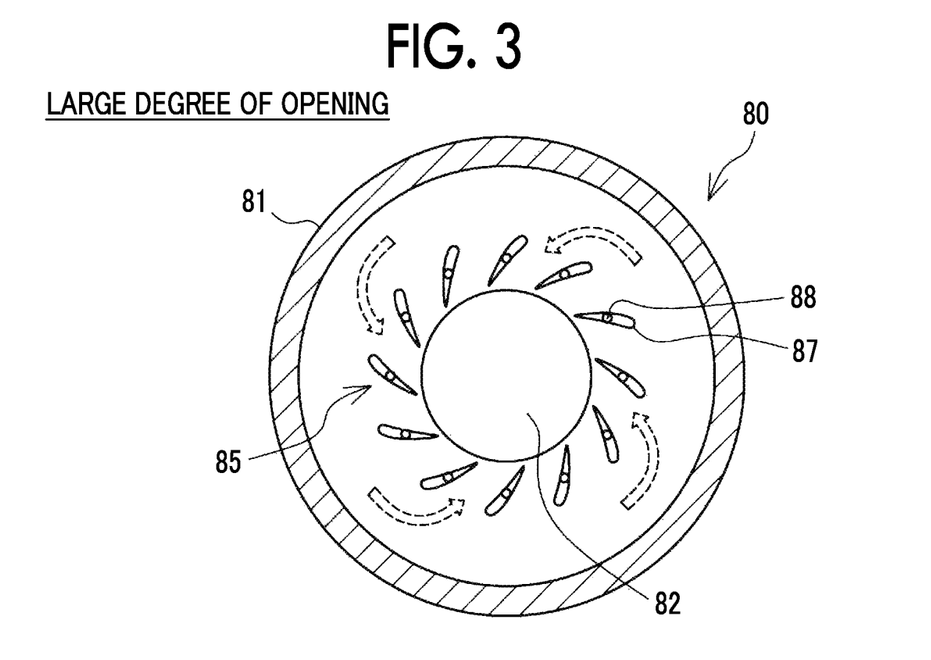
FIG. 3 is a sectional view taken along line 3-3 in FIG. 2.
Figure 4:
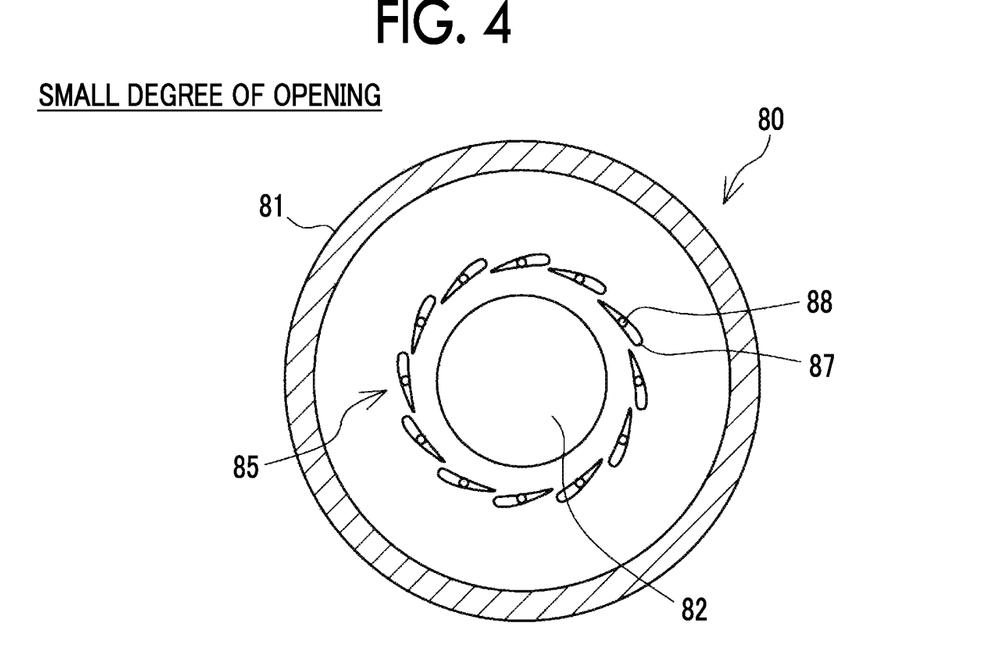
FIG. 4 is a sectional view taken along line 3-3 in FIG. 2.

FIGS. 3 and 4 are sectional views of the turbine 80 taken along line 3-3 in FIG. 2. FIG. 3 schematically illustrates an example in which the degree of opening is relatively large (a large degree of opening) and FIG. 4 schematically illustrates an example in which the degree of opening is relatively small (a small degree of opening).

A plurality of variable vanes 87 is arranged in a circumferential direction outside the turbine wheel 82 in a radial direction. Each variable vane 87 is configured to be rotatable by a predetermined angle about the corresponding shaft portion 88. Each shaft portion 88 is connected to the changing mechanism driving motor 86 via a unison ring and a link mechanism which are not illustrated. When the variable vanes 87 pivot, the magnitude of a gap between neighboring variable vanes 87 changes and the degree of opening changes.

A passage sectional area in which the cathode off-gas flows is large when the degree of opening is large, and is small when the degree of opening is small. The degree of opening may be expressed, for example, by a proportion of an actual passage sectional area when the passage sectional area in a fully open state is set to 100%. When the degree of opening decreases, the pressure difference of the cathode off-gas between the upstream pressure and the downstream pressure of the turbine 80 increases and an expansion ratio of the cathode off-gas passing through the turbine wheel 82 increases.

Here, the expansion ratio of the cathode off-gas refers to a ratio of a pressure P4 of the cathode off-gas at an inlet of the turbine 80 (hereinafter simply referred to as an "inlet pressure P4") to a pressure P6 of the cathode off-gas at an outlet of the turbine 80 (hereinafter simply referred to as an "outlet pressure P6"). In general, as the expansion ratio (P4/P6) becomes larger, a temperature T6 of the cathode off-gas at the outlet of the turbine 80 (hereinafter also referred to as a "discharge temperature T6") becomes lower.

The cathode gas supply system 40 illustrated in FIG. 1 supplies a cathode gas to the fuel cell 15. The cathode gas supply system 40 includes an upstream supply passage 41, an air cleaner 42, an atmospheric pressure sensor 43, an air cleaner temperature sensor 44, an air flowmeter 45, a downstream supply passage 51, an intercooler 52, a supply gas temperature sensor 53, a supply gas pressure sensor 54, and an inlet valve 55, in addition to the compressor 60 of the unit 100.

The upstream supply passage 41 constitutes a flow passage upstream from the compressor 60 in the cathode gas supply system 40. The air cleaner 42 removes dust when the cathode gas is taken in. The atmospheric pressure sensor 43 detects an atmospheric pressure. The air cleaner temperature sensor 44 detects an outside air temperature. The air flowmeter 45 detects an amount of cathode gas taken in the air cleaner 42. The detection results of the atmospheric pressure sensor 43, the air cleaner temperature sensor 44, and the air flowmeter 45 are transmitted to the control unit 90.

The downstream supply passage 51 constitutes a flow passage downstream from the compressor 60 in the cathode gas supply system 40. The intercooler 52 cools the cathode gas which has been compressed by the compressor 60 and has increased in temperature. The supply gas temperature sensor 53 measures the temperature of the cathode gas supplied to the fuel cell 15. The supply gas pressure sensor 54 measures a pressure of the cathode gas supplied to the fuel cell 15. The inlet valve 55 is disposed closer to the fuel cell 15 than a junction to a bypass flow passage 73 in the downstream supply passage 51. The inlet valve 55 adjusts a flow rate of the cathode gas in accordance with a command from the control unit 90.

The cathode gas discharge system 70 discharges a cathode gas from the fuel cell 15. The cathode gas discharge system 70 includes a cathode gas discharge passage 71, a pressure regulating valve 72, a bypass flow passage 73, a bypass valve 74, and a muffler 78 in addition to the turbine 80 of the above-mentioned unit 100.

The cathode off-gas discharged from the fuel cell 15 flows in the cathode gas discharge passage 71. The pressure regulating valve 72 is disposed closer to the fuel cell 15 than a junction with the bypass flow passage 73 in the cathode gas discharge passage 71. The pressure regulating valve 72 adjusts a pressure of the cathode gas in the fuel cell 15 in accordance with a command from the control unit 90. The bypass flow passage 73 connects the downstream supply passage 51 to the cathode gas discharge passage 71. The bypass valve 74 is disposed in the bypass flow passage 73. The bypass valve 74 adjusts a flow rate of the cathode gas flowing in the bypass flow passage 73 in accordance with a command from the control unit 90.

A downstream end of the anode off-gas/liquid passage 39 of the anode gas supply/discharge system 30 is connected to a part downstream from the turbine 80 in the cathode gas discharge passage 71. The muffler 78 is disposed downstream from a junction with the anode off-gas/liquid passage 39 in the cathode gas discharge passage 71. The muffler 78 reduces exhaust sound of the cathode off-gas.

The control unit 90 is a microcomputer including a central processing unit (CPU) and a main storage device and is constituted as an electronic control unit. The control unit 90 controls the operation of the fuel cell system 10. The control unit 90 acquires output signals from various sensors such as the atmospheric pressure sensor 43, the air cleaner temperature sensor 44, the air flowmeter 45, the supply gas temperature sensor 53, and the supply gas pressure sensor 54. The control unit 90 outputs drive signals to various valves such as the main stop valve 33, the pressure regulating valve 34, the anode off-gas/liquid valve 38, the inlet valve 55, the pressure regulating valve 72, and the bypass valve 74 or the units associated with generation of power in the fuel cell 15 such as the motor 62, the changing mechanism driving motor 86, the coolant pump 24, and the circulation pump 37. The control unit 90 increases and decreases an amount of energy recovered from the cathode off-gas by driving the changing mechanism 85. The control unit 90 performs freezing avoidance control which will be described later.

The control unit 90 increases an amount of energy recovered from the cathode off-gas by determining and controlling the degree of opening depending on the flow rate of the cathode off-gas in normal control. In this embodiment, first, the control unit 90 determines a target value of an expansion ratio of the cathode off-gas (hereinafter referred to as a "target expansion ratio") and determines the degree of opening with reference to a turbine characteristics map indicting a relationship between the target expansion ratio, the flow rate of the cathode off-gas, and the degree of opening.

In this embodiment, an upper limit value of an expansion ratio P4/P6 which is determined depending on a pressure P3 at an outlet of the fuel cell 15 (hereinafter simply referred to as a "fuel cell outlet pressure P3") is used as the target expansion ratio. In this embodiment, the fuel cell outlet pressure P3 can be calculated in consideration of a pressure loss in the fuel cell 15 or the like based on the pressure measured by the supply gas pressure sensor 54 and the degrees of opening of the inlet valve 55, the pressure regulating valve 72, and the bypass valve 74. The fuel cell outlet pressure P3 may be measured by providing a pressure sensor in the pressure regulating valve 72. In this embodiment, the outlet pressure P6 is calculated as an approximate value of the atmospheric pressure detected by the atmospheric pressure sensor 43, but may be calculated by applying a correction coefficient to the atmospheric pressure in consideration of the pressure loss in the muffler 78 or the like. It is preferable that the inlet pressure P4 not be greater than the fuel cell outlet pressure P3 in order to maintain the pressure in the fuel cell 15 at an appropriate value. Accordingly, the upper limit value of the inlet pressure P4 depends on the fuel cell outlet pressure P3. Accordingly, the upper limit value of the expansion ratio P4/P6 is determined by the outlet pressure P6 and the fuel cell outlet pressure P3, and the target expansion ratio is determined.

Figure 5:
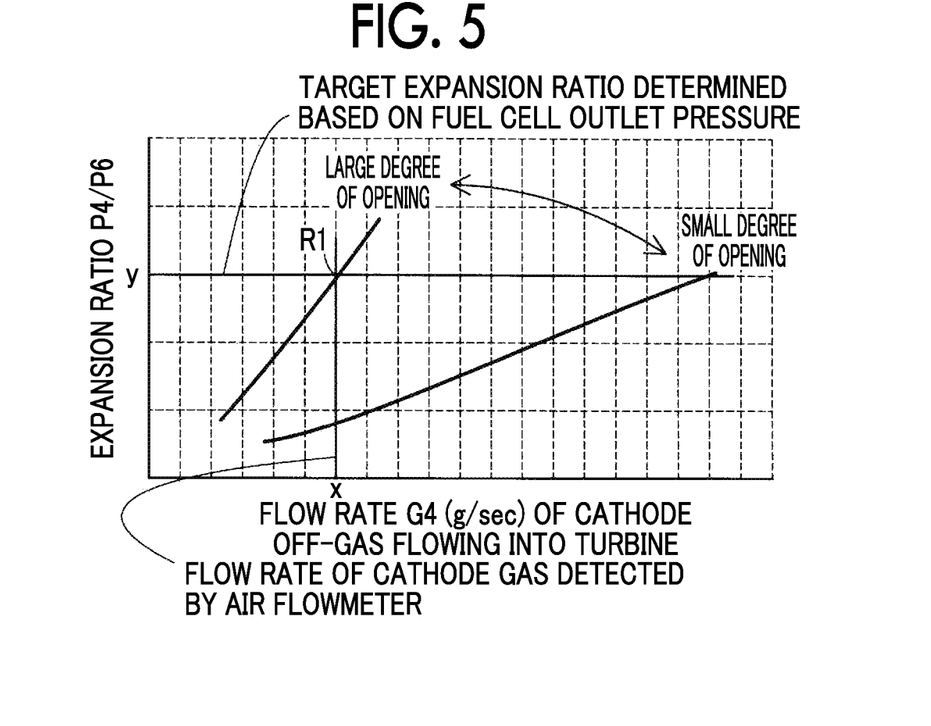
FIG. 5 is a diagram illustrating an example of a turbine characteristics map which is used in normal control.

FIG. 5 is a diagram illustrating an example of a turbine characteristics map which is used for normal control. In FIG. 5, the vertical axis represents the expansion ratio P4/P6, and the horizontal axis represents a flow rate G4 of the cathode off-gas flowing into the turbine 80. In FIG. 5, for the purpose of convenience of explanation, two curves in a case in which the degree of opening is relatively large (a large degree of opening) and a case in which the degree of opening is relatively small (a small degree of opening) are illustrated and other curves with different degrees of opening are not illustrated. The turbine characteristics map is stored in advance in the main storage device of the control unit 90.

In this embodiment, a flow rate of a cathode gas detected by the air flowmeter 45 is used as a flow rate G4 of the cathode off-gas flowing into the turbine 80. Instead, the flow rate G4 may be calculated by applying a correction coefficient to the flow rate of the cathode gas detected by the air flowmeter 45 or may be measured by providing a flow rate sensor in the cathode gas discharge passage 71.

The control unit 90 determines a degree of opening from an intersection between the flow rate G4 of the cathode off-gas and the determined target expansion ratio with reference to the turbine characteristics map illustrated in FIG. 5. In FIG. 5, an example in which the flow rate G4 of the cathode off-gas is x and the target expansion ratio is y is illustrated. Since the curve located at the intersection R1 between x and y is a curve of a "large degree of opening," the control unit 90 determines the degree of opening to be the "large degree of opening." The control unit 90 outputs a drive signal to the changing mechanism driving motor 86 such that the degree of opening of the changing mechanism 85 becomes the determined degree of opening.

A large amount of water vapor or droplets which are products generated by a chemical reaction of the fuel cell 15 is included in the cathode off-gas. Accordingly, when the temperature of the cathode off-gas decreases at the time of passing through the turbine 80, the turbine wheel 82, the turbine housing 81, or the like is dew-condensed and frozen due to a large amount of water vapor or droplets included in the cathode off-gas. The freezing of the turbine 80 is likely to occur in a cold region in which an outside air temperature is low. Therefore, in the fuel cell system 10 according to this embodiment, it is possible to curb a decrease of the discharge temperature T6 of the cathode off-gas discharged from the turbine 80, to curb a decrease in temperature of the turbine 80, and to prevent freezing of the turbine 80 by performing freezing avoidance control which will be described later.

Figure 6:
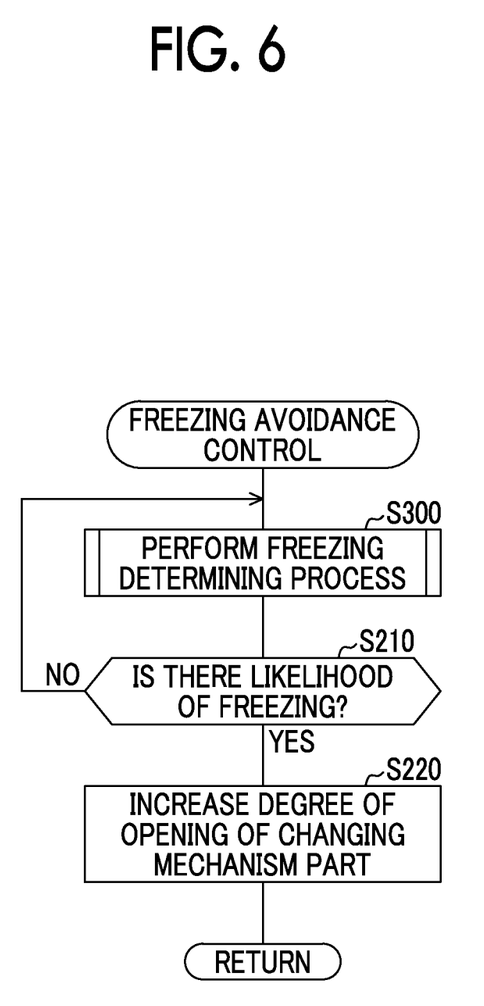
FIG. 6 is a flowchart illustrating a sequence of freezing avoidance control.

A-2. Freezing Avoidance Control:

FIG. 6 is a flowchart illustrating a flow of freezing avoidance control. The freezing avoidance control is repeatedly performed after a starter switch (not illustrated) of a vehicle mounted with the fuel cell has been pushed and the fuel cell system 10 has been started. The freezing avoidance control may be performed at the same time as starting of the fuel cell system 10 or may be performed at an arbitrary other time.

The control unit 90 performs a freezing determining process (Step S300). The freezing determining process refers to a process of determining whether there is a likelihood that the turbine 80 will freeze.

Figure 7:
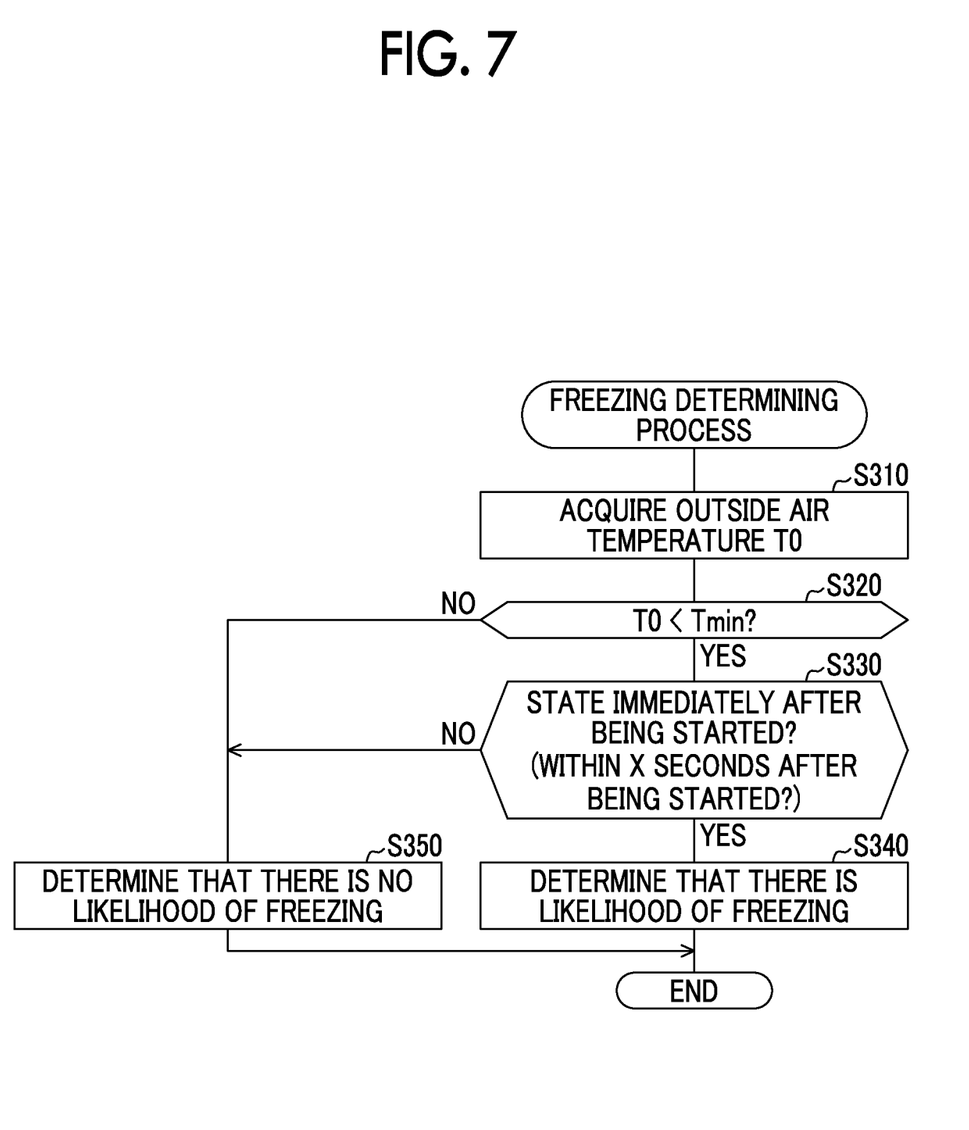
FIG. 7 is a flowchart illustrating a sequence of a freezing determining process.

FIG. 7 is a flowchart illustrating a flow of the freezing determining process. The control unit 90 acquires an outside air temperature T0 which is measured by the air cleaner temperature sensor 44 (Step S310). The control unit 90 determines whether the acquired outside air temperature T0 is lower than a predetermined threshold temperature Tmin (Step S320). The threshold temperature Tmin refers to a temperature correlated with the discharge temperature T6 at which there is a likelihood of freezing of the turbine 80, and is stored in advance in the main storage device of the control unit 90. In this embodiment, the threshold temperature Tmin is set to 5° C., but may be set to an arbitrary other temperature which is correlated with the discharge temperature T6 at which there is a likelihood of freezing of the turbine 80.

When it is determined in Step S320 that the outside air temperature T0 is not lower than the threshold temperature Tmin (NO in Step S320), the control unit 90 determines that there is no likelihood of freezing (Step S350), ends the freezing determining process, and returns to the freezing avoidance control illustrated in FIG. 6.

On the other hand, when it is determined in Step S320 illustrated in FIG. 7 that the outside air temperature T0 is lower than the threshold temperature Tmin (YES in Step S320), the control unit 90 determines whether the fuel cell system 10 has been just started (Step S330). Specifically, the control unit 90 determines whether X seconds has not elapsed after the fuel cell system 10 has been started. X seconds is determined in advance and stored in the main storage device of the control unit 90. In this embodiment, X second is set to 60 seconds, but may be set to an arbitrary other value indicating that the fuel cell system 10 has been just started.

When the fuel cell system 10 has been just started, the temperature of the fuel cell 15 does not become so higher and thus the temperature of the cathode off-gas discharged from the fuel cell 15 is low. Accordingly, when the fuel cell system 10 has been just started, there is a relatively high likelihood of freezing of the turbine 80.

When it is determined in Step S330 that the fuel cell system 10 has not been just started (NO in Step S330), the control unit 90 determines that there is no likelihood of freeze (Step S350), ends the freeze determining process, and returns to the freeze avoidance control illustrated in FIG. 6.

On the other hand, when it is determined in Step S330 illustrated in FIG. 7 that the fuel cell system 10 has been just started (YES in Step S330), the control unit 90 determines that there is a likelihood of freezing (Step S340), ends the freezing determining process, and returns to the freezing avoidance control illustrated in FIG. 6.

In the freezing avoidance control illustrated in FIG. 6, it is detected whether it has been determined that there is a likelihood of freezing as the result of the freezing determining process of Step S300 (Step S210). When it is detected in Step S210 that there is no likelihood of freezing (NO in Step S210), the control unit 90 returns to Step S300.

On the other hand, when it is detected in Step S210 that there is a likelihood of freezing (YES in Step S210), the control unit 90 increases the degree of opening of the changing mechanism 85, that is, the degree of opening of a flow passage for the cathode off-gas passing through the turbine 80 (Step S220). More specifically, the control unit 90 rotates the variable vanes 87 to increase the degree of opening by outputting a command to the changing mechanism driving motor 86. Increasing the degree of opening means that the degree of opening is increased in comparison with that before Step S220 has been performed. In this embodiment, the degree of opening is increased by 30%, but may be increased by an arbitrary other degree of opening such as 10% or 20%. A relatively large degree of opening at which there is a low likelihood of freezing of the turbine 80 in which the expansion ratio of the cathode off-gas passing through the turbine 80 is relatively low and the decrease in temperature of the cathode off-gas is relatively small may be set in advance and the degree of opening of the changing mechanism 85 may be increased to be greater than such a degree of opening.

When the degree of opening is increased, a passage sectional area increases and the pressure loss of the cathode off-gas decreases, and thus the expansion ratio (P4/P6) decreases. Accordingly, expansion of the cathode off-gas discharged from the turbine 80 is curbed, the decrease of the discharge temperature T6 is curbed, the decrease in temperature of the turbine 80 is curbed, and freezing of the turbine 80 is prevented. After Step S220 has been performed, the control unit 90 returns to Step S300.

In this embodiment, the outside air temperature T0 can be considered to be a subordinate concept of the correlation temperature in the SUMMARY and a subordinate concept of the temperature of the cathode gas which has not yet been introduced into the compressor.

In the fuel cell system 10 according to this embodiment, the degree of opening is increased when the outside air temperature T0 is lower than the threshold temperature Tmin and the fuel cell system 10 has been just started. Accordingly, since the expansion ratio P4/P6 of the cathode off-gas can be decreased, it is possible to curb expansion of the cathode off-gas discharged from the turbine 80 and to curb a decrease of the discharge temperature T6. Accordingly, it is possible to curb a decrease in temperature of the turbine 80 and to prevent freezing of the turbine 80.

Freezing of the turbine 80 is likely to occur particularly in a cold region in which the outside air temperature T0 is low. In the fuel cell system 10 according to this embodiment, since the freezing determining process is performed based on the outside air temperature T0, it is possible to accurately detect a low-temperature environment in which the turbine 80 is likely to freeze.

It is determined that there is a likelihood of freezing of the turbine 80 when the fuel cell system 10 has been just started, and it is determined that there is no likelihood of freezing of the turbine 80 when the fuel cell system 10 has not been just started. Accordingly, when a predetermined time has elapsed after the fuel cell system 10 has been started, the temperature of the fuel cell 15 increases, the temperature of the cathode off-gas increases, and there is a low likelihood of freezing of the turbine 80, it is possible to curb an excessive increase of the degree of opening due to determination that there is a likelihood of freezing and to curb a decrease of the amount of energy recovered from the cathode off-gas.

B. Second Embodiment

Figure 8:
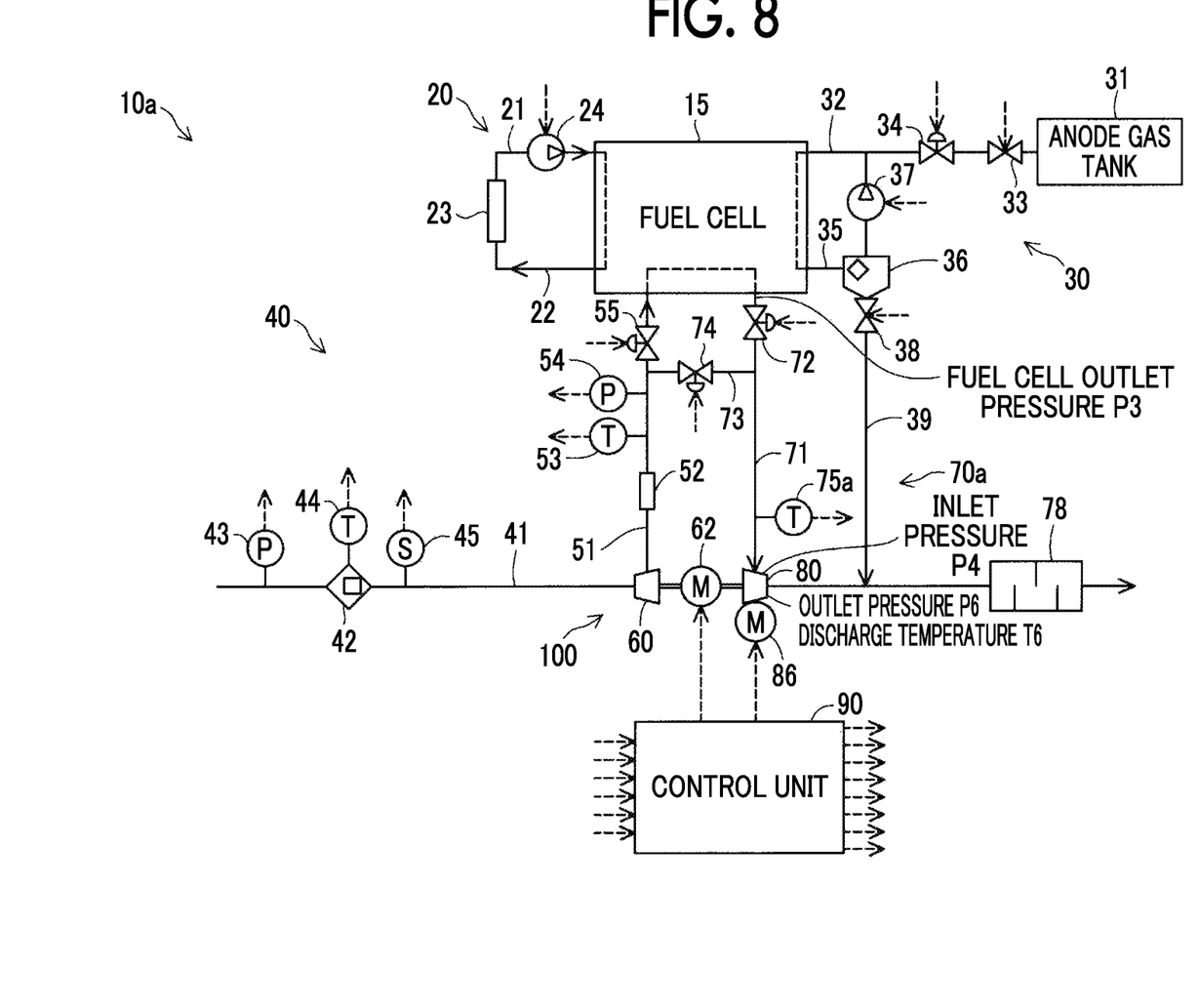
FIG. 8 is a diagram schematically illustrating a configuration of a fuel cell system according to a second embodiment.

FIG. 8 is a diagram schematically illustrating a configuration of a fuel cell system 10a according to a second embodiment. The fuel cell system 10a according to the second embodiment is different from the fuel cell system 10 according to the first embodiment, in a turbine inlet temperature sensor 75a which is additionally provided and specific means of the freezing determining process. The other configuration is the same as in the fuel cell system 10 according to the first embodiment, and thus the same elements and the same steps will be referred to by the same reference signs and detailed description thereof will be omitted.

The turbine inlet temperature sensor 75a is disposed between the pressure regulating valve 72 and the turbine 80 in the cathode gas discharge passage 71 of a cathode gas discharge system 70a. The turbine inlet temperature sensor 75a detects a temperature T4 of a cathode off-gas introduced into the turbine 80 (hereinafter also referred to as an "inlet temperature T4"). The result of detection from the turbine inlet temperature sensor 75a is transmitted to the control unit 90.

Figure 9:
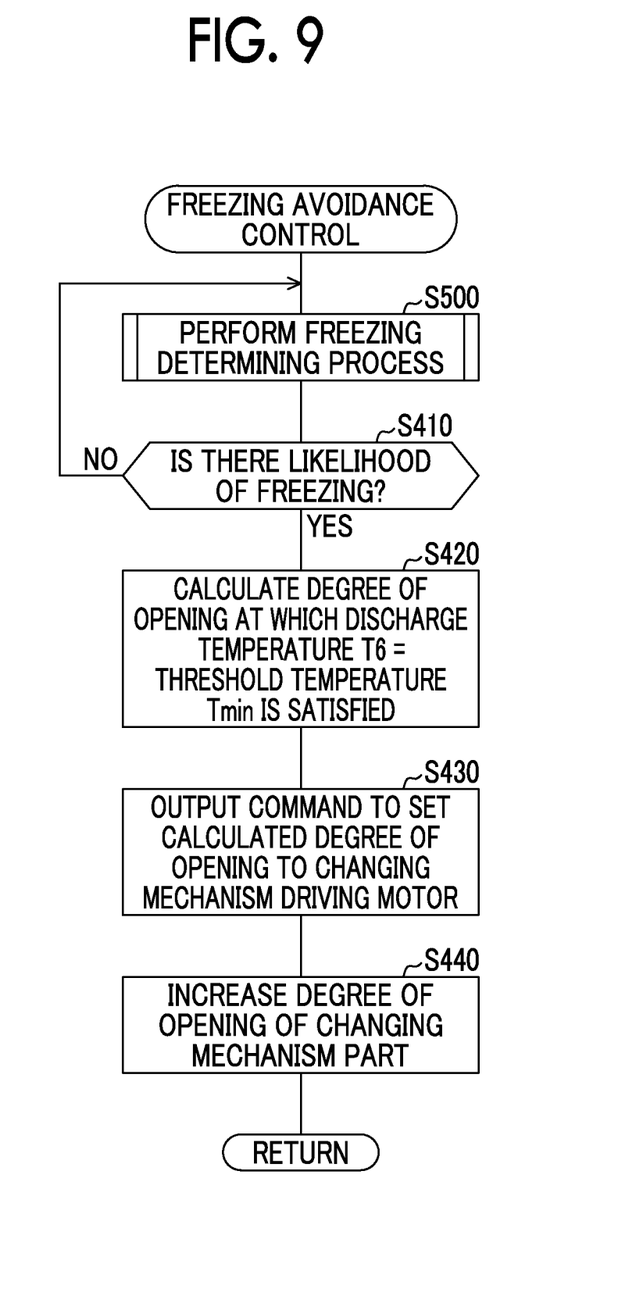
FIG. 9 is a flowchart illustrating a sequence of freezing avoidance control according to the second embodiment.

FIG. 9 illustrates a flowchart illustrating a flow of freezing avoidance control according to the second embodiment. First, a freezing determining process is performed (Step S500).

Figure 10:
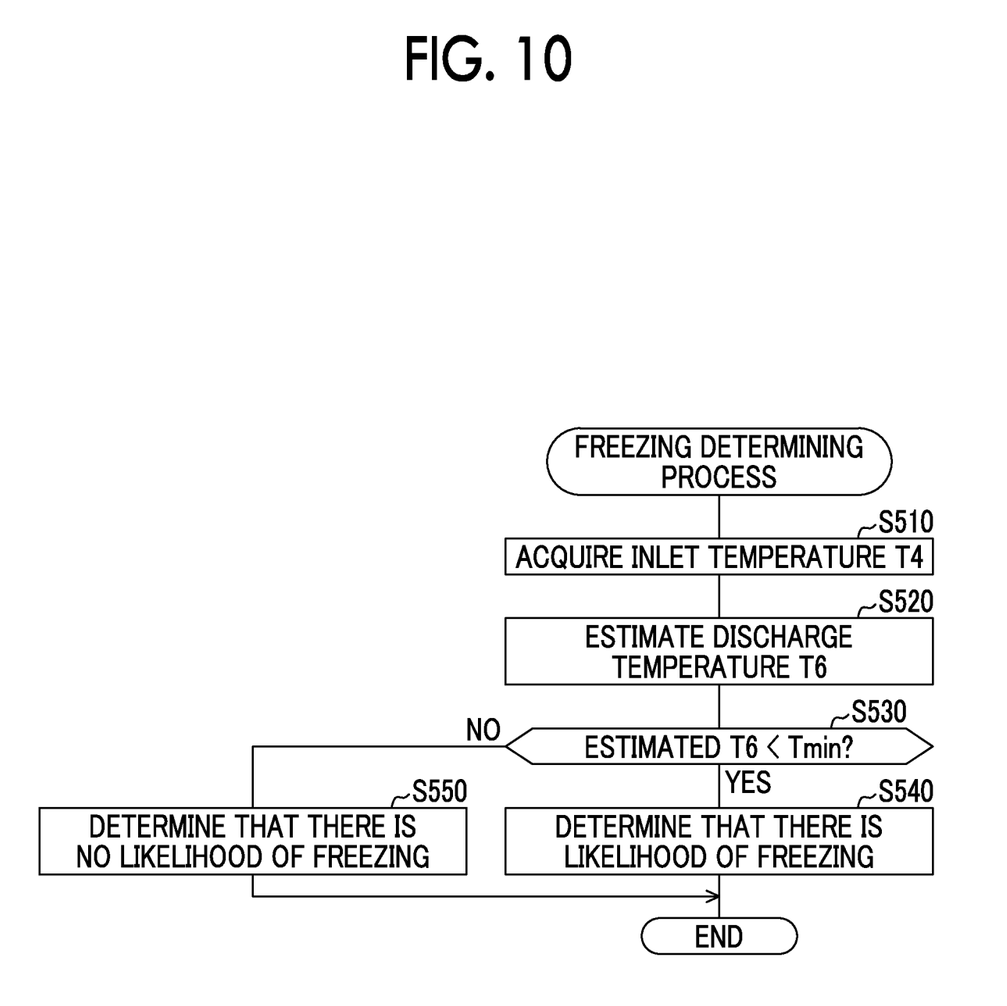
FIG. 10 is a flowchart illustrating a sequence of a freezing determining process according to the second embodiment.

FIG. 10 is a flowchart illustrating a flow of the freezing determining process according to the second embodiment. The control unit 90 acquires the inlet temperature T4 detected by the turbine inlet temperature sensor 75a (Step S510). The control unit 90 estimates the discharge temperature T6 of the turbine exhaust gas discharged from the turbine 80 when the above-mentioned normal control is performed based on the acquired inlet temperature T4 and a turbine characteristics map indicating turbine efficiency $\eta t$ (Step S520).

The turbine efficiency $\eta t$ is calculated as a ratio of power Lt at the outlet of the turbine 80 to power (Lt)ad in adiabatic change at the inlet of the turbine 80 as expressed by Equation (1).

$$\eta t = Lt/(Lt(ad)) \quad (1)$$

The power (Lt)ad in the adiabatic change at the inlet of the turbine 80 is calculated by Equation (2) and the power Lt at the outlet of the turbine 80 is calculated by Equation (3).

$$(Lt)ad = Cpg \times G4 \times T4 \left\{ 1 - \frac{1}{(P4/P6)^{\frac{K-1}{K}}} \right\} \quad (2)$$

$$Lt = Cpg \times G4(T4 - T6). \quad (3)$$

Here, Cpg denotes specific heat and k denotes a ratio of specific heat (Cp/Cv). Cp denotes specific heat at a constant pressure and Cv denotes specific heat at a constant volume. Equation (2) can be replaced with Equation (5) by applying Equation (4).

$$A = \frac{1}{(P4/P6)^{\frac{K-1}{K}}} \quad (4)$$

$$(Lt)ad = Cpg \times G4 \times T4(1 - A) \quad (5)$$

Accordingly, Equation (6) representing the discharge temperature T6 is derived from Equations (1), (3), and (5).

$$T6 = T4 - T4 \times \eta t \times (1-A) \quad (6)$$

Figure 11:
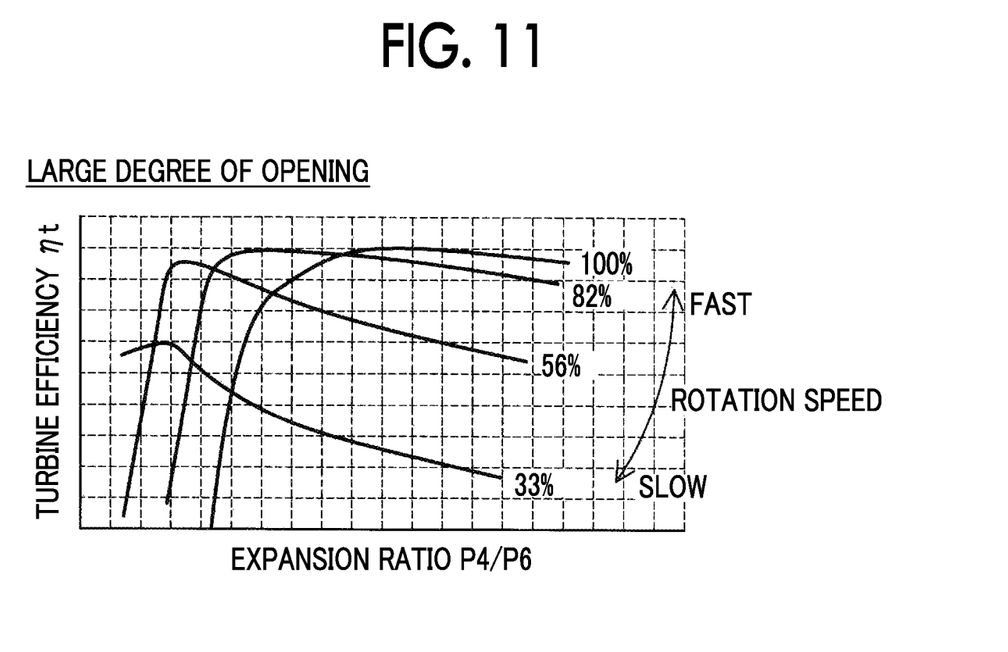
FIG. 11 is a diagram illustrating an example of a turbine characteristics map indicating turbine efficiency.
Figure 12:
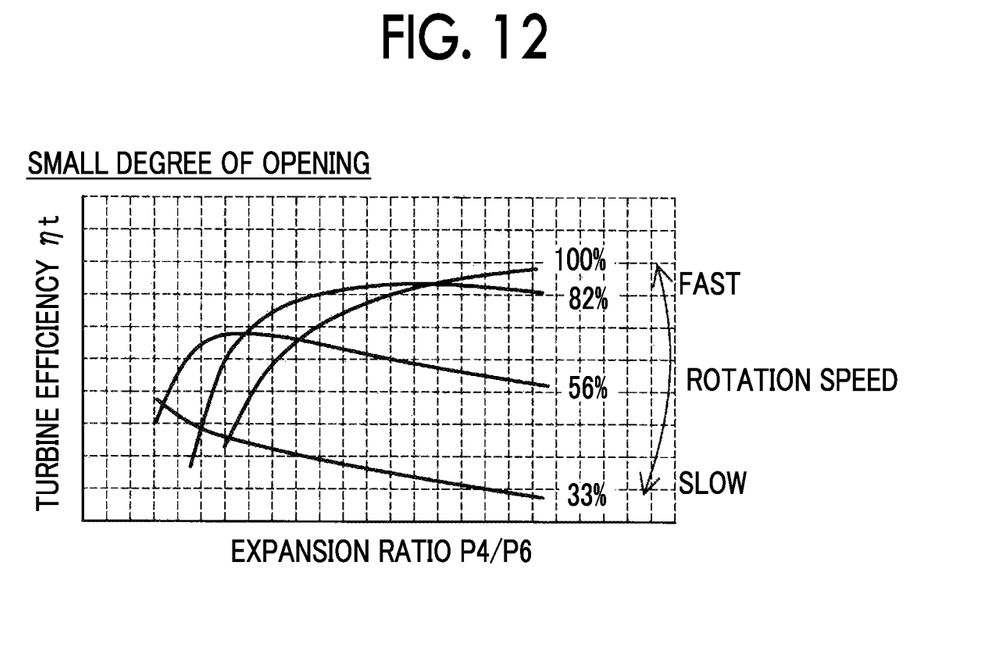
FIG. 12 is a diagram illustrating an example of a turbine characteristics map indicating turbine efficiency.

FIGS. 11 and 12 are diagrams illustrating an example of a turbine characteristics map indicating turbine efficiency $\eta t$. FIG. 11 illustrates a case in which the degree of opening is relative large (a large degree of opening) and FIG. 12 illustrates a case in which the degree of opening is relative small (a small degree of opening). In FIGS. 11 and 12, the vertical axis represents the turbine efficiency $\eta t$ and the horizontal axis represents the expansion ratio P4/P6. In FIGS. 11 and 12, for the purpose of convenience of explanation, four curves corresponding to rotation speeds of the turbine wheel 82 are representatively illustrated, and other curves with other rotation speeds are not illustrated. A rotation speed is expressed by a proportion of an actual rotation speed when a maximum rotation speed is set to 100%. The main storage device of the control unit 90 stores a plurality of turbine characteristics maps with different degrees of opening in addition to the turbine characteristics maps illustrated in FIGS. 11 and 12.

In the above-mentioned normal control, the expansion ratio P4/P6 is set as a target expansion ratio, and the degree of opening is determined from the turbine characteristics map illustrated in FIG. 5. The control unit 90 can calculate the turbine efficiency $\eta t$ based on the rotation speed of the turbine wheel 82 and the expansion ratio P4/P6 with reference to the turbine characteristics map indicating the turbine efficiency $\eta t$ according to the degree of opening when the normal control is performed.

In Step S520 illustrated in FIG. 10, the control unit 90 estimates the discharge temperature T6 by applying the expansion ratio P4/P6 and the turbine efficiency $\eta t$ when the normal control is performed to Equation (6) representing the discharge temperature T6.

The control unit 90 acquires the estimated discharge temperature T6 and determines whether the estimated discharge temperature T6 is lower than a predetermined threshold temperature Tmin (Step S530). The threshold temperature Tmin is set to, for example, 5° C.

When it is determined in Step S530 that the estimated discharge temperature T6 is not lower than the threshold temperature Tmin (NO in Step S530), the control unit 90 determines that there is no likelihood of freezing (Step S550), ends the freezing determining process, and returns to the freezing avoidance control illustrated in FIG. 9.

On the other hand, when it is determined in Step S530 illustrated in FIG. 10 that the estimated discharge temperature T6 is lower than the threshold temperature Tmin (YES in Step S530), the control unit 90 determines that there is a likelihood of freezing (Step S540), ends the freezing determining process, and returns to the freezing avoidance control illustrated in FIG. 9.

In the freezing avoidance control illustrated in FIG. 9, as the result of the freezing determining process of Step S500, it is detected whether it is determined that there is a likelihood of freezing (Step S410). When it is detected in Step S410 that there is no likelihood of freezing (NO in Step S410), the control unit 90 returns to Step S500.

On the other hand, when it is detected in Step S410 that there is a likelihood of freezing (YES in Step S410), the control unit 90 calculates the degree of opening at which the discharge temperature T6 is equal to the threshold temperature Tmin (Step S420). More specifically, the control unit 90 applies the threshold temperature Tmin as the discharge temperature T6 in Equation (6), applies the turbine efficiency $\eta t$ when the normal control is performed, and calculates the expansion ratio P4/P6. Then, the control unit 90 calculates the degree of opening based on the calculated expansion ratio P4/P6 and the flow rate G4 of the cathode off-gas with reference to the turbine characteristics map illustrated in FIG. 5.

The control unit 90 outputs a command to set the degree of opening of the changing mechanism 85 to the degree of opening calculated in Step S420 to the changing mechanism driving motor 86 (Step S430). Accordingly, the degree of opening of the changing mechanism 85 is increased (Step S440) and the control unit returns to Step S500. Since the discharge temperature T6 increases with an increase in the degree of opening and becomes equal to the threshold temperature Tmin, a decrease of the discharge temperature T6 is curbed, the decrease in temperature of the turbine 80 is curbed, and freezing of the turbine 80 is prevented.

In this embodiment, the turbine inlet temperature sensor 75a can be considered to be a subordinate concept of the temperature sensor that detects the temperature of cathode off-gas which has been discharged from the fuel cell and has not yet been introduced into the turbine in the SUMMARY, the inlet temperature T4 can be considered to be a subordinate concept of the temperature of the cathode off-gas which has been discharged from the fuel cell and has not yet been introduced into the turbine in the SUMMARY, and the estimated discharge temperature T6 can be considered to be a subordinate concept of the correlation temperature in the SUMMARY.

The above-mentioned freezing avoidance control according to the second embodiment achieves the same advantageous effects as the freezing avoidance control according to the first embodiment. Since the discharge temperature T6 is estimated, it is possible to control the degree of opening using a temperature with a high correlation with the actual discharge temperature T6. Since the discharge temperature T6 is estimated based on the inlet temperature T4 of the turbine located at a position physically close to the outlet of the turbine, it is possible to curb a decrease in estimation accuracy of the discharge temperature T6 and to curb a decrease in determination accuracy of the freezing determining process.

The control unit 90 calculates the degree of opening at which the discharge temperature T6 is equal to the threshold temperature Tmin and increases the degree of opening of the changing mechanism 85 such that it becomes equal to the calculated degree of opening. Accordingly, since an excessive increase in the degree of opening can be curbed, it is possible to curb a decrease in the amount of energy recovered from the cathode off-gas due to an excessive decrease in the expansion ratio P4/P6.

C. Modified Example

C-1. First Modified Example

In the above-mentioned embodiments, the degree of opening is increased when it is determined that there is a likelihood of freezing (YES in Steps S210 and S410), but the disclosure is not limited thereto. For example, when it is determined that there is a likelihood of freezing (YES in Steps S210 and S410), control may be performed such that the degree of opening is not equal to or less than a predetermined degree of opening. The predetermined degree of opening may be set in advance as a relatively large degree of opening at which there is a low likelihood of freezing of the turbine 80. In other words, a degree of opening at which the expansion ratio of the cathode off-gas passing through the turbine 80 is relatively small and the decrease in temperature of the cathode off-gas is relatively small may be set in advance as the predetermined degree of opening. With this configuration, the same advantageous effects as those in the fuel cell systems 10 and 10a according to the above-mentioned embodiment, can be achieved. When a current degree of opening is larger than the predetermined degree of opening, the degree of opening may be decreased within a range in which the degree of opening is not equal to or less than the predetermined degree of opening and thus it is possible to prevent freezing of the turbine 80 and to curb a decrease in the amount of energy recovered from the cathode off-gas. For example, when it is determined that there is a likelihood of freezing (YES in Steps S210 and S410), the degree of opening may be maintained. Maintaining of the degree of opening means that the degree of opening is not changed after the determination of Steps S210 and S410. According to this configuration, it is possible to curb a decrease in the amount of energy recovered from the cathode off-gas due to an excessive increase of the degree of opening. That is, in general, freezing avoidance control of not setting the degree of opening to be equal to or less than the predetermined degree of opening may be performed when the correlation temperature is lower than the predetermined threshold temperature Tmin at which there is a likelihood of freezing of the turbine 80. With this configuration, the same advantageous effects as those in the fuel cell systems 10 and 10a according to the above-mentioned embodiments can also be achieved.

C-2. Second Modified Example

In the freezing avoidance control according to the second embodiment, the degree of opening at which the discharge temperature T6 is equal to the threshold temperature Tmin may not be detected and the degree of opening may be uniformly increased. In other words, in the second embodiment, the same freezing avoidance control as in the first embodiment may be performed. In this configuration or the freezing avoidance control according to the first embodiment, the degree of opening may be stepwise increased depending on the temperature difference between the outside air temperature T0 or the estimated discharge temperature T6 and the threshold temperature Tmin. For example, the degree of opening may be increased by 20% when the difference between the outside air temperature T0 or the estimated discharge temperature T6 and the threshold temperature Tmin is less than 5° C., and the degree of opening may be increased by 30% when the difference is equal to or greater than 5° C. With this configuration, the same advantageous effects as those in the fuel cell systems 10 and 10a according to the above-mentioned embodiments can also be achieved.

C-3. Third Modified Example

In the freezing determining process according to the first embodiment, Step S330 may be skipped. That is, the freezing determining process may be performed regardless of whether the fuel cell system 10 has been just started. A configuration in which the outside air temperature T0 may be acquired via the Internet may be employed instead of the configuration in which the outside air temperature is detected by the air cleaner temperature sensor 44. The freezing determining process may be performed using a temperature of the cathode gas which has not yet been introduced into the compressor 60 and which is measured by another temperature sensor disposed in the upstream supply passage 41 instead of the outside air temperature T0. With this configuration, the same advantageous effects as those in the fuel cell system 10 according to the first embodiment can also be achieved.

C-4. Fourth Modified Example

In the first embodiment, the freezing determining process may be performed using the inlet temperature T4 of the turbine detected by the turbine inlet temperature sensor 75a disposed in the fuel cell system 10a according to the second embodiment. In this example, since the inlet temperature T4 of the turbine is assumed to be higher than the outside air temperature T0 due to the cathode gas passing through the compressor 60 and the fuel cell 15, the threshold temperature Tmin may be set to a higher value. For example, the threshold temperature Tmin may be set to 10° C. With this configuration, the same advantageous effects as those in the fuel cell system 10 according to the first embodiment can also be achieved.

C-5. Fifth Modified Example

In the freezing avoidance control according to the above-mentioned embodiments, the freezing determining process is performed in accordance with the flowcharts illustrated in FIGS. 7 and 10, but the freezing avoidance control may be performed using a map which is stored in advance in the main storage device of the control unit 90. For example, instead of the freezing determining process, the degree of opening may be set to be greater than a lower limit value by storing at least the lower limit value of the degree of opening and the correlation temperature as a map indicating a correlation in which freezing of the turbine 80 can be avoided in advance, applying the acquired correlation temperature to the map, and referring to the map. In the above-mentioned embodiments, the turbine characteristics map illustrated in FIG. 5 is used for determining the degree of opening in the normal control, but the degree of opening may be determined using a relational expression indicating a relationship between the flow rate G4 of the cathode off-gas, the expansion ratio P4/P6, and the degree of opening instead of the turbine characteristics map. In calculating the turbine efficiency ηt in the second embodiment, a turbine characteristics map in which the inlet temperature T4 is further reflected may be used or a correction coefficient based on the inlet temperature T4 may be applied thereto. With this configuration, the same advantageous effects as those in the fuel cell systems 10 and 10a according to the above-mentioned embodiments can also be achieved.

C-6. Sixth Modified Example

The system configuration of the fuel cell system 10a according to the second embodiment is only an example and can be modified in various forms. For example, the temperature of the cathode off-gas which has been discharged from the fuel cell 15 and has not yet been introduced into the turbine 80 may be used instead of the inlet temperature T4 measured by the turbine inlet temperature sensor 75a. In this configuration, the temperature of the cathode off-gas may be measured, for example, by another temperature sensor disposed in the outlet of the fuel cell 15 or the like. For example, a pressure sensor that measures the inlet pressure P4 of the turbine 80 or a pressure sensor that measures the outlet pressure P6 of the turbine 80 may be additionally provided, and the expansion ratio P4/P6 may be calculated based on a value measured by the pressure sensor. For example, by additionally providing the temperature sensor that measures the discharge temperature T6, Steps S510 and S520 can be skipped and the freezing determining process may be performed based on the discharge temperature T6 measured by the temperature sensor. With this configuration, the same advantageous effects as those in the fuel cell system 10a according to the second embodiment can also be achieved.

C-7. Seventh Modified Example

In the freezing determining process according to the first and second embodiments, the changing mechanism 85 has a so-called a variable nozzle type configuration, but the disclosure is not limited thereto. The changing mechanism 85 may have an arbitrary other configuration in which the degree of opening of the flow passage for the cathode off-gas passing through the turbine 80 can be changed to adjust the pressure difference between the upstream pressure and the downstream pressure of the turbine 80, such as a movable flap type and a variable nozzle width type. With this configuration, the same advantageous effects as those in the fuel cell systems 10 and 10a according to the above-mentioned embodiments can also be achieved.

C-8. Eighth Modified Example

In the above-mentioned embodiments, the turbine 80 is connected to the compressor 60 via the motor 62 and driving of the motor 62 is assisted by the energy recovered from the cathode off-gas, but the energy of the cathode off-gas may be recovered as power of the turbine 80 and driving of the motor 62 may be assisted by electric power generated by rotating another motor with the recovered power. That is, in general, the turbine 80 may recover at least a part of energy of the cathode off-gas using the pressure difference between the upstream pressure and the downstream pressure of the turbine 80 and may assist driving of the motor 62 using the recovered energy. In the above-mentioned embodiment, the fuel cell systems 10 and 10a are mounted and used in a fuel-cell vehicle, but may be mounted in an arbitrary other moving object or may be used for a stationary fuel cell.

The disclosure is not limited to the above-mentioned embodiments and can be embodied in various configurations without departing from the scope thereof. For example, technical features in the embodiments corresponding to technical features in the aspects described in the SUMMARY can be appropriately subjected to replacement or combination in order to solve some or all of the above-mentioned problems or to achieve some or all of the above-mentioned advantageous effects. The technical features can be appropriately deleted unless they are described to be essential in this specification.

What is claimed is:

1. A fuel cell system comprising:
   a fuel cell;
   a compressor that supplies a cathode gas to the fuel cell;
   a motor that drives the compressor;
   a cathode gas discharge passage into which a cathode off-gas discharged from the fuel cell flows;
   a turbine that is disposed in the cathode gas discharge passage and is driven by the cathode off-gas, the turbine including a changing mechanism that changes a degree of opening of a flow passage for the cathode off-gas passing through the turbine to adjust a pressure difference between an upstream pressure and a downstream pressure of the turbine, the turbine recovering at least a part of energy of the cathode off-gas using the pressure difference and assisting driving of the motor with the recovered energy; and
   a control unit programmed to drive the changing mechanism to increase or decrease the recovered energy,
   wherein the control unit is programmed to acquire a correlation temperature correlated with a first temperature of the cathode off-gas discharged from the turbine and to perform freezing avoidance control of not setting the degree of opening to be equal to or less than a predetermined degree of opening when the correlation temperature is lower than a predetermined threshold temperature at which the turbine is able to become frozen.

2. The fuel cell system according to claim 1, wherein the control unit is programmed to increase the degree of opening as the freezing avoidance control.

3. The fuel cell system according to claim 1, wherein the control unit is programmed to acquire a second temperature of the cathode gas which has not yet been introduced into the compressor as the correlation temperature.

4. The fuel cell system according to claim 3, wherein the control unit is programmed to perform the freezing avoidance control when the correlation temperature is lower than the threshold temperature and a predetermined time has not elapsed after the fuel cell system has been started.

5. The fuel cell system according to claim 1, further comprising a temperature sensor that detects a third temperature of the cathode off-gas which has been discharged from the fuel cell and has not yet been introduced into the turbine, wherein the control unit is programmed to estimate the first temperature based on the detected third temperature of the cathode off-gas and to acquire the estimated first temperature as the correlation temperature.

6. The fuel cell system according to claim 5, wherein the control unit is programmed to calculate the degree of opening at which the correlation temperature is equal to the threshold temperature and to control the degree of opening such that the degree of opening becomes the calculated degree of opening as the freezing avoidance control.

7. A control method for a turbine that is driven by a cathode off-gas discharged from a fuel cell to recover at least a part of energy of the cathode off-gas and to assist driving of a driving motor of a compressor supplying the cathode gas to the fuel cell using the recovered energy, the control method comprising:

acquiring a correlation temperature correlated with a first temperature of the cathode off-gas discharged from the turbine; and not setting a degree of opening of a flow passage for the cathode off-gas passing through the turbine to be equal to or less than a predetermined degree of opening when the correlation temperature is lower than a predetermined threshold temperature at which the turbine is able to become frozen.

* * * * *